(12) United States Patent
Tang

(10) Patent No.: US 10,705,110 B2
(45) Date of Patent: Jul. 7, 2020

(54) AIRCRAFT NONLINEAR DYNAMIC INSTABILITY WARNING SYSTEM

(71) Applicant: Shaojie Tang, Sugar Land, TX (US)

(72) Inventor: Shaojie Tang, Sugar Land, TX (US)

( * ) Notice: Subject to any disclaimer, the term of this patent is extended or adjusted under 35 U.S.C. 154(b) by 104 days.

(21) Appl. No.: 16/156,619

(22) Filed: Oct. 10, 2018

(65) Prior Publication Data

US 2020/0116751 A1   Apr. 16, 2020

(51) Int. Cl.
B64D 45/00 (2006.01)
G01P 13/02 (2006.01)
G09B 9/20 (2006.01)

(52) U.S. Cl.
CPC ............ *G01P 13/025* (2013.01); *B64D 45/00* (2013.01); *G09B 9/206* (2013.01)

(58) Field of Classification Search
CPC ....... G01P 13/025; B64D 45/00; G09B 9/206; G06F 30/15
USPC .......................................... 703/2, 8; 701/14
See application file for complete search history.

(56) References Cited

U.S. PATENT DOCUMENTS

| | | | |
|---|---|---|---|
| 2003/0056588 A1* | 3/2003 | Fell ..................... | G01C 19/5677 73/503.3 |
| 2010/0318336 A1* | 12/2010 | Falangas ................. | G06F 30/15 703/8 |
| 2015/0203215 A1* | 7/2015 | Falangas ................. | G06F 30/15 703/2 |

OTHER PUBLICATIONS

Schmidt et al, aircraft rock by interial coupling, atmospheric flight mechanics conference 1991 (Year: 1991).*
Ananthkrishnan et al, Prevention of jump in intertia-coupled roll maneuvers of aircraft, 1993 (Year: 1993).*
Nguyen, Nhan, Intertial force coupling to nonlinear aeroelasticity of flexible wing aircraft, 2016 (Year: 2016).*

* cited by examiner

*Primary Examiner* — Albert K Wong (57) ABSTRACT

A system and method for predicting aircraft nonlinear instability includes the steps of: (1) a pre-built aircraft state parameters for all possible flight conditions, (2) real time measuring flight parameters to determine aircraft state, (3) calculating the inertial coupling frequencies and periods as well as the nonlinear instability threshold based on the nonlinear instability theory recently developed by the inventor, (4) providing a first warning signal if the threshold is approached, (5) providing a second warning signal if the threshold has been exceeded.

15 Claims, 6 Drawing Sheets

Figure 5a Preset flight path $\gamma_0$, trimmed pitch AOA $\alpha_T$, and a deviated flight pitch angle $\theta$ for a pitch up flight mode

Figure 5b Flight path $\gamma$, angle of attack $\alpha$, and pitch angle $\theta$ for a pitch up flight mode

Figure 6a Preset flight path $\gamma_0$, trimmed pitch AOA $\alpha_T$, and a deviated flight pitch angle $\theta$ for a pitch down flight mode

Figure 6b Flight path $\gamma$, angle of attack $\alpha$, and pitch angle $\theta$ for a pitch down flight mode

AIRCRAFT NONLINEAR DYNAMIC INSTABILITY WARNING SYSTEM

FIELD

The present disclosure is generally related to flight warning system for aircrafts, more specifically, to systems for providing a warning for aircraft nonlinear instability and a warning for potential loss of control.

BACKGROUND

Despite the 100 year aviation history, evidence indicates that when faced with uncontrolled roll, pitch, or yaw, pilots sometimes have difficulties in quickly responding to the situation which needs rapid action to correct in order to avoid crash. Trainings for avoiding uncontrolled roll, pitch, or yaw is either not effective enough or not correct at all. The reason for such awkward situation in the industry is that the mechanism of the uncontrolled roll, pitch, or yaw has not been understood. The relationship between the current flight simulator fidelities and real aircrafts is susceptible when the roll, pitch, and yaw motions become large enough since the current flight dynamics are based on the linearization of roll, pitch, and yaw motions, meaning that the aircraft motions have to be small enough to be accurate. In real world, however, aircraft could roll 360° in the sky, like what happened to TWA Flight 841 in 1979. Many mysterious aircraft crashes were due to loss of control caused by the nonlinear instability, a new scientific discovery made by the inventor in the book "Nonlinear Instability and Inertial Coupling Effect—The Root Causes Leading to Aircraft Crashes, Land Vehicle Rollovers, and Ship Capsizes" (ISBN 9781732632301, to be published in November 2018). To name a few, the following incidents and accidents were caused by the nonlinear instability and analyzed in the book.

- The incident of TWA Flight 841 Boeing 727-31 in 1979,
- the crash of Japan Airlines Flight 123 Boeing 747-100SR in 1985,
- the crash of Northwest Flight 255 MD DC-9-82 in 1987,
- the crash of Delta Airlines Flight 1141 Boeing 727-232 in 1988,
- the crash of United Airlines Flight 585 Boeing 737-200 in 1991,
- the crash of USAir Flight 405 Fokker F-28 in 1992,
- the crash of B-52H strategic bomber in 1994,
- the crash of USAir Flight 427 Boeing 737-300 in 1994,
- the incident of Boeing 737-236 Advanced G-BGJI in 1995,
- the crash of SilkAir Flight 185 Boeing 737-300 in 1997,
- the crash of EgyptAir Flight 990 Boeing 767-366ER in 1999,
- the crash of American Airlines Flight 587 Airbus A300-605R in 2001,
- the crash of PT. Mandala Airlines Flight 091 Boeing 737-200 in 2005,
- the crash of Spanair Flight 5022 MD DC-9-82 in 2008,
- the crash of Air France Flight 447 Airbus A330 in 2009,
- the crash of Colgan Air Flight 3407 Bombardier DHC-8-400 in 2009,
- the crash of Air Algeria Flight 5017 MD-83 in 2014,
- the crash of FlyDubai Flight 981 Boeing 737-800 in 2016.

A fundamental mistake has been made in dealing with the aircraft dynamics in the current academic and industry practices. For an aircraft, the governing equations for its rotational motions (roll, pitch, and yaw) are given by Math. 1 in the vector form. They were obtained based on Newton's second law of motions in the body-fixed reference frame, $$d\vec{H}/dt = -\vec{\omega} \times \vec{H} + \vec{M}, \quad \text{Math. 1}$$

wherein $\vec{\omega} = (p,q,r) = (\dot{\varphi}, \dot{\theta}, \dot{\psi})$: the angular velocities of the vehicle; $\varphi$, $\theta$, $\psi$: the roll, pitch, and yaw angle about the principal axes of inertias X, Y, Z, respectively; $\vec{H} = (I_x p, I_y q, I_z r)$: the angular momentum of the vehicle; $I_x$, $I_y$, $I_z$: the moment of inertias about the principal axes of inertias X, Y, Z, respectively (These parameters are constants in this frame); $\vec{M} = (M_x, M_y, M_z)$: the external moments acting on the aircraft about the principal axes of inertia. In both the aviation academy and industry, the current practice to deal with Math. 1 is to make a linearization approximation first and then solve the equations because the nonlinear term $-\vec{\omega} \times \vec{H}$ is too difficult to deal with. The linearization approximation makes the nonlinear term $-\vec{\omega} \times \vec{H}$ disappear, and the equations become $$d\vec{H}/dt = \vec{M}. \quad \text{Math. 2}$$

However, the equations are still considered in the body-fixed reference frame which is a non-inertial frame. The reason for this is that the external moments ($M_x$, $M_y$, $M_z$) acting on vehicles and the moments of inertia $I_x$, $I_y$, $I_z$ are needed to be considered in the body-fixed reference frame.

The fundamental mistake is that the nonlinear term $-\vec{\omega} \times \vec{H}$ cannot be neglected because they are the inertial moments tied to the non-inertial reference frame which is the body-fixed reference frame in this case. This mistake is similarly like we neglect the Coriolis force which equals $-2\vec{\Omega} \times \vec{V}$, where $\vec{\Omega}$ is the angular velocity vector of the earth and $\vec{V}$ is the velocity vector of a moving body on earth. Then we try to explain the swirling water draining phenomenon in a bathtub. In this case, we are considering the water moving in the body-fixed and non-inertial reference frame which is the earth. The Coriolis force is an inertial force generated by the rotating earth on the moving objects which are the water particles in this case. Without the Coriolis force, we cannot explain the motions of the swirling water. Similarly in the aircraft dynamics, the aircraft is rotating, and we consider the rotational motions of the aircraft in the body-fixed and non-inertial reference frame which is the aircraft itself. The difference between the two cases is that in the former the object (water particle) has translational motions ($\vec{V}$) while in the latter the object (aircraft itself) has rotational motions ($\vec{\omega}$) but they both have the important inertial effects which cannot be neglected because both the objects are considered in the non-inertial reference frames. In the former the inertial effect is the Coriolis force $-2\vec{\Omega} \times \vec{V}$ while in the latter the inertial effect is the inertial moment $-\vec{\omega} \times \vec{H}$ which are not forces but moments since we are dealing with rational motions instead of translational one. Without the inertial moment, we cannot explain many phenomena which happened to aircrafts, like uncommanded motions of roll, pitch, and yaw; and Pilot-Induced-Oscillation (PIO).

In the inventor's book, the equations Math. 1 have been solved analytically without the linearization approximation and it was found that the pitch motion, without loss of generality assuming the pitch moment of inertia to be the intermediate between the roll and yaw inertias, is conditionally stable and becomes unstable in certain circumstances. A brief summary of the findings is given below. The governing equations of rotational motions of an aircraft under a periodic external pitch moment can be written in scalar form as $$I_x\ddot{\varphi}+b_1\dot{\varphi}+k_1\varphi=(I_y-I_z)\dot{\theta}\dot{\psi}, \qquad \text{Math. 3}$$

$$I_y\ddot{\theta}+b_2\dot{\theta}+k_2\theta=(I_z-I_x)\dot{\varphi}\dot{\psi}+M_{21}\cos(\omega_{21}t+\alpha_{21}), \qquad \text{Math. 4}$$

$$I_z\ddot{\psi}+b_3\dot{\psi}+k_3\psi=(I_x-I_y)\dot{\varphi}\dot{\theta}, \qquad \text{Math. 5}$$

wherein $b_1$, $b_2$, $b_3$ are the damping coefficients for roll, pitch, and yaw, respectively; $k_1$, $k_2$, $k_3$ are the restoring coefficients for roll, pitch, and yaw, respectively; $M_{21}$ is the external pitch moment amplitude; $\omega_{21}$ and $\alpha_{21}$ are the frequency and phase of the external pitch moment, respectively. These equations represent a dynamic system governing the rotational dynamics of an aircraft when taking off or approaching to landing. According to the current practice in the industries under the linearization approximation, these equations become $$I_x\ddot{\varphi}+b_1\dot{\varphi}+k_1\varphi=0, \qquad \text{Math. 6}$$

$$I_y\ddot{\theta}+b_2\dot{\theta}+k_2\theta=M_{21}\cos(\omega_{21}t+\alpha_{21}), \qquad \text{Math. 7}$$

$$I_z\ddot{\psi}+b_3\dot{\psi}+k_3\omega=0. \qquad \text{Math. 8}$$

Therefore the current practice says that the aircraft will only have pitch motion, no roll and yaw motions because there are no moments acting on roll and yaw directions. In reality, however, there exist moments acting in roll and yaw directions as indicated by the nonlinear terms in the right hand sides of Math. 3 and Math. 5, respectively. These moments are the components of the inertial moment vector $-\vec{\omega}\times\vec{H}$ along roll and yaw directions, respectively, and they are real and must not be neglected. The linearization theory assumes that these nonlinear terms are small so that they can be neglected. The fact is that this assumption is not always valid. The reason is explained below. The roll and yaw dynamic systems of an aircraft are harmonic oscillation systems as shown in Math. 3 and Math. 5. As we know for a harmonic system, a resonance phenomenon can be excited by a driving mechanism no matter how small it is as long as its frequency matches the natural frequency of the system. It was found in the inventor's book mentioned above that under certain circumstances the nonlinear terms, $(I_y-I_z)\dot{\theta}\dot{\psi}$ and $(I_x-I_y)\dot{\varphi}\dot{\theta}$ can simultaneously excite roll and yaw resonances, respectively. In these cases, the pitch motion becomes unstable and the roll and yaw motions grow exponentially at the same time under the following two conditions, Math. 9 and Math. 10. Such nonlinear instability is a phenomenon of double resonances, i.e. roll resonance in addition to yaw resonance.

$$A_P > A_{P-TH} = \frac{1}{\omega_{21}}\sqrt{\frac{b_1 b_3}{(I_z-I_y)((I_y-I_x)}} \text{ and} \qquad \text{Math. 9}$$

$$\omega_{21}=\omega_{10}+\omega_{30},$$

$$A_P > A_{P-TH} = \frac{1}{\omega_{21}}\sqrt{\frac{b_1 b_3}{(I_z-I_y)(I_y-I_x)}} \text{ and} \qquad \text{Math. 10}$$

$$\omega_{21}=|\omega_{10}-\omega_{30}|,$$

wherein $A_P$ is the pitch response amplitude under the external pitch moment $M_{21}\cos(\omega_{21}t+\alpha_{21})$; $\omega_{10}=\sqrt{k_1/I_x}$ and $\omega_{30}=\sqrt{k_3/I_z}$ are the roll and yaw natural frequencies, respectively. The nonlinear dynamics says that the pitch motion is stable until the pitch motion reaches the threshold values $A_{P-TH}$ given in Math. 9 or Math. 10. These threshold values show that the vehicle has two dangerous exciting frequencies in pitch. These two frequencies are either the addition of the roll natural frequency $\omega_{10}$ and the yaw natural frequency $\omega_{30}$ or the subtraction of them. At each frequency, the pitch amplitude threshold for pitch to become unstable is inversely proportional to the pitch exciting frequency, proportional to the square root of the product of the roll and yaw damping coefficients, and inversely proportional to the square root of the product of the difference between the yaw and pitch moments of inertia and the difference between the pitch and roll moments of inertia. In summary, there are three factors having effects on the pitch threshold and they are a) the roll and yaw damping, b) the pitch exciting frequency, and c) the distribution of moments of inertia. The most dominant one among these three factors is the damping effect since the damping coefficients could go to zero in certain circumstances, for example, aircraft yaw damper malfunction which makes the yaw damping become zero, or aircraft in stall condition which makes the roll damping become zero. When either the roll damping or the yaw damping is approaching to zero, the pitch threshold is approaching to zero as well and the pitch motion, even it is small but as long as larger than the threshold value, will become unstable and transfer energy to excite roll and yaw resonances. That is the root mechanism behind all these mysterious tragedies mentioned above. In the inventor's book detailed scientific proofs based on analytical, numerical, and experimental results have been given. The inventor's another patent application U.S. Ser. No. 16/153,883 is related to an apparatus used as a demonstrator in the book to demonstrate the phenomenon of nonlinear pitch instability. The inventor also filed another patent application U.S. Ser. No. 16/153,925 for a simulator to simulate the nonlinear dynamics of aircrafts.

The nonlinear instability is always tied with the rotational direction where the moment of inertia is the intermediate between the other two inertias. Depending on the mass distribution of an aircraft, it could have roll, pitch, or yaw nonlinear instability if the roll, pitch, or yaw moment of inertia is the intermediate one, respectively. For example, generally commercial jet aircrafts, like Boeing 737, 747, and A330 etc. will have nonlinear pitch instability problem and military transport aircrafts, like B-52 will have nonlinear roll instability problem.

As shown in Math. 9 and Math. 10, the nonlinear pitch instability thresholds are dependent only on aircraft flight state parameters, for example for pitch instability, like roll and yaw damping coefficients, roll and yaw natural frequencies, and the moments of inertia. Therefore it would be desirable to have a system and method that can calculate actual nonlinear instability threshold and to provide warning signal to pilots based on the real time measured flight parameters.

SUMMARY

This invention is to provide the flight crew with situational awareness of the flight nonlinear instability status. It shows the crew what are the nonlinear coupling frequencies and periods, and gives warning signals to flight crew if the nonlinear instability threshold is approached or has been exceeded.

In one embodiment, a method is presented for identifying nonlinear pitch instability using current flight parameters. The current flight parameters are then used and compared with a pre-determined flight parameters stored on board to identify flight coefficients to determine the inertial coupling frequencies and periods. The nonlinear pitch instability threshold is calculated and compared with the current pitch response to determine whether a warning signal is generated or not.

In another embodiment, a method is presented for identifying nonlinear roll instability using current flight parameters. The current flight parameters are then used and compared with a pre-determined flight parameters stored on board to identify flight coefficients to determine the inertial coupling frequencies and periods. The nonlinear roll instability threshold is calculated and compared with the current roll response to determine whether a warning signal is generated or not.

In yet another embodiment, a method is presented for identifying nonlinear yaw instability using current flight parameters. The current flight parameters are then used and compared with a pre-determined flight parameters stored on board to identify flight coefficients to determine the inertial coupling frequencies and periods. The nonlinear yaw instability threshold is calculated and compared with the current yaw response to determine whether a warning signal is generated or not.

The features, functions, and advantages discussed above can be achieved independently in various embodiments or may be combined in yet other embodiments. Further details can be seen with reference to the following description and drawings.

DESCRIPTION

The following text and figures set forth a detailed description of specific examples of the invention to teach those skilled in the art how to make and utilize the best mode of the invention.

Figure 1:
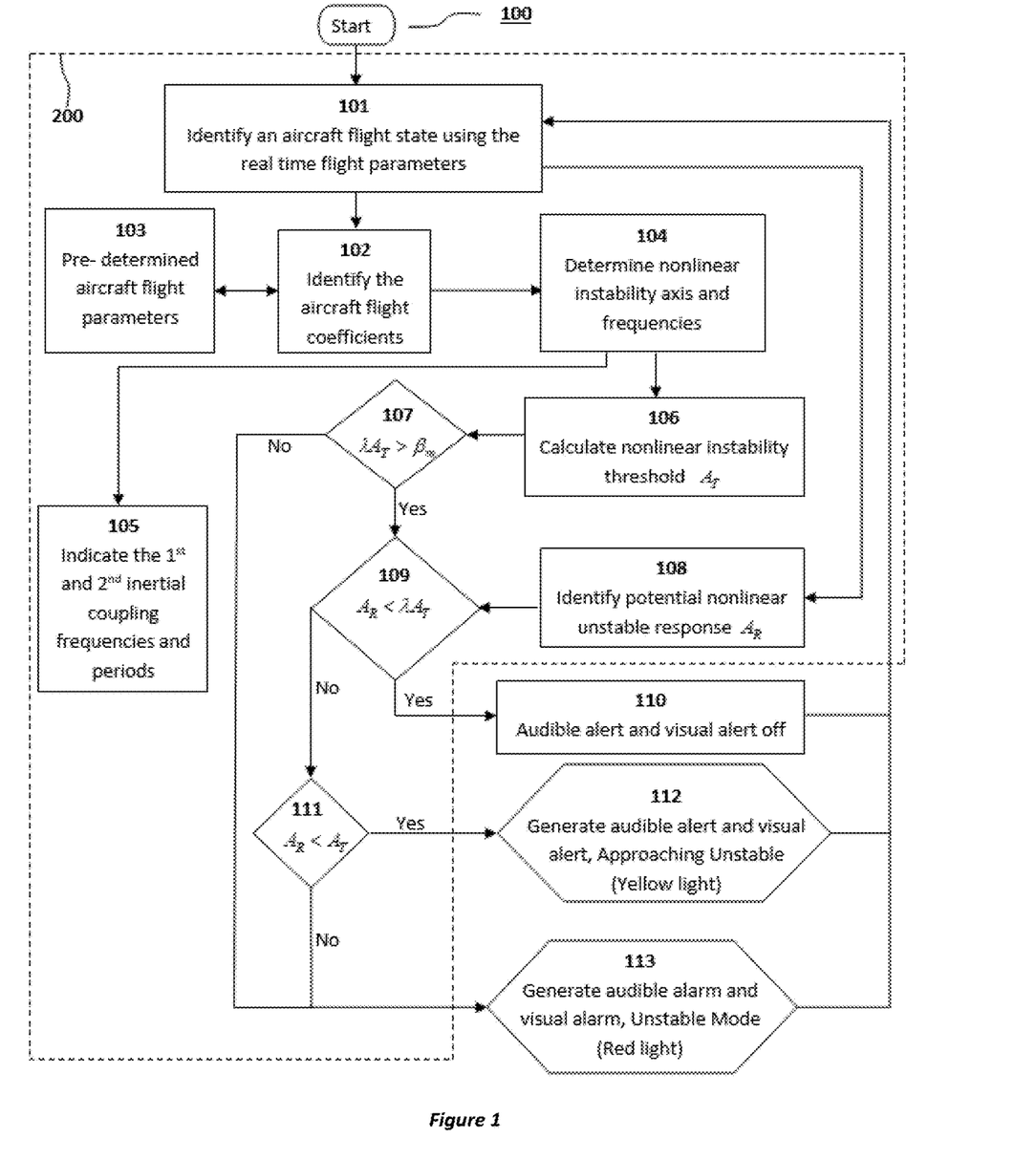
FIG. 1 is 1 schematic diagram of an aircraft nonlinear instability warning system in accordance with the disclosure.

Referring to FIG. 1, an aircraft nonlinear instability warning system 100 is part of or associated with the flight management computer (FMC) 200. The FMC 200 provides the system 100 with the necessary current flight parameters to feed into a module 101. The module 101 identifies the current flight state using the real time flight parameters and passes the information to a module 102 which communicates with a pre-determined aircraft flight coefficients 103 to identify the aircraft flight coefficients, such as the damping coefficients of roll, pitch, and yaw as well as the restoring coefficients of roll, pitch, and yaw. A module 104 determines the nonlinear instability axis and the associated frequencies using the coefficients from the module 102 and then passes the results to a module 105 which indicates the $1^{st}$ and $2^{nd}$ inertial coupling frequencies and periods. A module 106 uses the flight coefficients to calculate the nonlinear instability threshold $A_T$. A module 107 is to determine whether an allowable nonlinear instability threshold $\lambda A_T$ is larger than a minimum threshold $\beta_m$ or not, where A is a safety factor less than 1, for example 0.9 or other number depending on aircraft size and type, and $\beta_m$ is a pre-determined small positive number, for example, 0.0175 radian (1°) or other small number depending on aircraft size and type. This minimum threshold $\beta_m$ is chosen to prevent the threshold from going to zero. This minimum threshold is a safety margin which needs to be determined during flight tests of every aircraft for light turbulence which is assumed to occur on every flight and causes slight, erratic changes in attitude of roll, pitch, and yaw. If the allowable threshold $\lambda A_T$ is larger than $\beta_m$, the $\lambda A_T$ will be the dominant threshold and the system 100 goes to a module 109. If the allowable threshold $\lambda A_T$ is smaller than $\beta_m$, $\beta_m$ becomes the dominant threshold and the aircraft current flight state is considered to be in a nonlinear unstable mode and the system 100 goes to a module 113. A module 108 identifies and calculates a potential nonlinear unstable response $A_R$. The module 109 is to determine whether the response $A_R$ is smaller than the allowable threshold $\lambda A_T$. If the response $A_R$ is less than $\lambda A_T$, the current flight state is considered to be in a stable mode and the system 100 goes to a module 110 to turn audible alert and visual alert off if they are on. If the response $A_R$ is larger than $\lambda A_T$, the current flight state is either in an approaching to unstable mode or already in an unstable mode. Then the system 100 goes to a module 111 for a further check. If $A_R$ is larger than $\lambda A_T$ but still smaller than $A_T$, the current flight state is in an approaching to unstable mode and the system 100 goes to a module 112 to generate and turn on audible and visual alerts for Approaching Unstable mode, maybe with a yellow light for example. If $A_R$ is larger than $A_T$, the current flight state is considered in an unstable mode and the system 100 goes to a module 113l to generate and turn on audible and visual alarms to warn the flight crew for the Unstable mode, maybe with a red light for example. The system 100 continues run during an entire flight.

Figure 2:
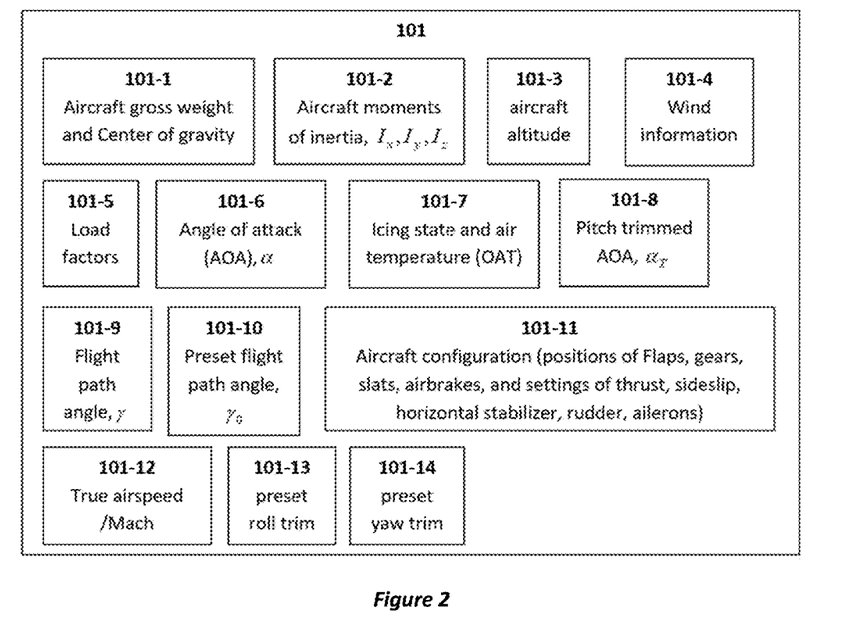
FIG. 2 is a diagram of aircraft flight parameters in accordance with the disclosure.

Referring to FIG. 2, the module 101 collects flight parameters and determines the current flight state. The flight parameters include the aircraft gross weight and the center of gravity location 101-1, the aircraft moments of inertia at this state 101-2, the aircraft altitude 101-3, the wind information 101-4, the load factors 101-5, the angle of attack (AOA) 101-6, the icing state and the outside air temperature 101-7, the pitch trimmed angle of attack (AOA) $\alpha_T$ 101-8, the current flight path angle $\gamma$ 101-9, the preset flight path angle $\gamma_0$ 101-10, the aircraft configuration 101-11, the true airspeed or Mach number (TAS) 101-12, preset roll trim 101-13, and preset yaw trim 101-14. The aircraft configuration includes positions of flaps, gears, slats, and airbrakes as well as the settings of thrust, sideslip, horizontal stabilizer, rudder, and ailerons.

Figure 3:
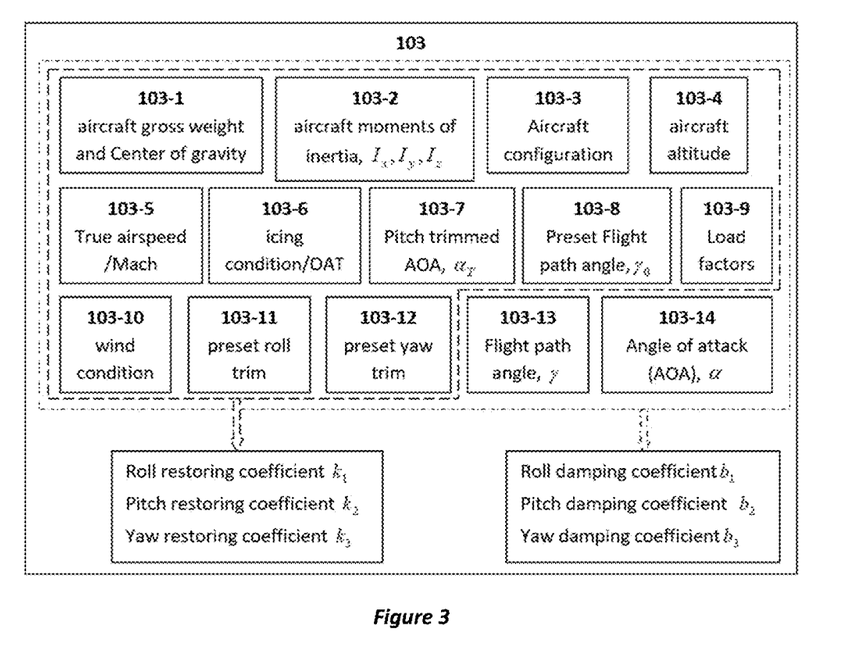
FIG. 3 is a flow chart for pre-measured values of restoring coefficients and damping coefficients in accordance with the disclosure.
Figure 4:
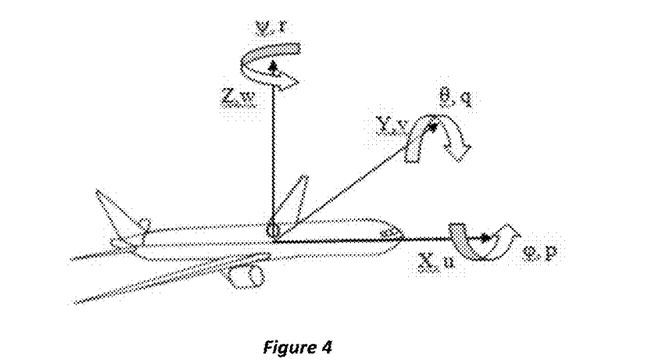
FIG. 4 is a diagram of aircraft with body axes.

The current flight state information is then passed to the module 102 which communicates with the flight state parameter module 103 as shown in FIG. 1 to identify the flight dynamic coefficients for the current flight state. The module 103 is stored in a hard drive of the FMC 200 and contains pre-determined flight parameters. As shown in FIG. 3, the module 103 includes aircraft gross weight and center of gravity location of flight state 103-1, aircraft moments of inertia 103-2, aircraft configuration 103-3, aircraft altitude 103-4, true airspeed or Mach number (TAS) 103-5, icing condition and outside atmosphere temperature (OAT) 103-6, pitch trimmed angle of attack (AOA, $\alpha_T$) 103-7, preset flight path angle ($\gamma_o$) 103-8, load factors 103-9, wind information 103-10, preset roll trim 103-11, preset yaw trim 103-12, flight path angle ($\gamma$) 103-13, and angle of attack (AOA, $\alpha$) 103-14. The module 103 also includes roll damping coefficients $b_1$, pitch damping coefficients $b_2$, yaw damping coefficients $b_3$ for every possible flight state. In addition, the module 103 also includes roll restoring coefficients $k_1$, pitch restoring coefficient $k_2$, yaw restoring coefficient $k_3$ for every possible flight state. These coefficients are to be determined by using free decay tests for roll, pitch, and yaw, respectively during flight tests for every possible flight state of an aircraft. In general, aircrafts have static stability in normal flight. By this means the aircraft can be trimmed to be in a stable equilibrium. The free decay tests are to be performed around a trimmed equilibrium condition. The trimmed equilibrium is a condition at which the aircraft continues to fly when the pilot releases the controls. Each flight state in the module 103 is determined first by the flight gross weight, the center of gravity, and the moments of inertia $I_x$, $I_y$, $I_z$ which are the moments of inertia of roll, pitch, and yaw about the principal axes of inertia X, Y, Z, respectively. These principal axes of inertia can be approximated by the body axes as shown in FIG. 4. Each flight state is further determined by two conditions to be tested. The first condition is a base case condition which corresponds to a trimmed equilibrium flight condition represented by a preset flight path angle ($\gamma_0$) 103-8 and a pitch trimmed angle of attack ($\alpha_T$) 103-7 in addition to other necessary parameter settings for flight. In this case, the aircraft is in a stable equilibrium and no pilot control is needed. The free decay tests are to be performed by a sharp and recognizable roll, pitch, and yaw input, respectively. The time histories of these aircraft responses from these tests are to be recorded and analyzed to determine the natural oscillation frequencies $\omega_{10}$, $\omega_{20}$, and $\omega_{30}$ for roll, pitch, and yaw motions at that flight state, respectively. From these natural frequencies, the restoring coefficients for roll, pitch, and yaw can be calculated as:

$$k_1 = I_x \omega_{10}^2, \; k_2 = I_y \omega_{20}^2, \; k_3 = I_z \omega_{30}^2. \quad \text{Math. 11}$$

Next for the same preset flight state with the same pitch trimmed AOA, $\alpha_T$ and the same preset flight path $\gamma_0$ as above, pilot applies control inputs to modify the flight path angle to a new value $\gamma$ and the angle of attack to a new value $\alpha$. In general, $\gamma$ is different with $\gamma_0$ and $\alpha$ is different with $\alpha_T$. The new $\gamma$ and $\alpha$ represent a flight state deviating from the preset state. In this condition, free decay tests are to be performed again. The time histories of the aircraft responses to a sharp and recognizable roll, pitch, and yaw inputs are to be recorded and analyzed to determine roll damping coefficient $b_1$, pitch damping coefficient $b_2$, and yaw damping coefficient $b_3$, respectively. In summary, the restoring coefficients $k_1$, $k_2$, $k_3$ are related to 103-1, 103-2, 103-3, 103-4, 103-5, 103-6, 103-7, 103-8, 103-9, 103-10, 103-11, and 103-12 as shown in FIG. 3. The damping coefficients $b_1$, $b_2$, $b_3$ are related to 103-1, 103-2, 103-3, 103-4, 103-5, 103-6, 103-7, 103-8, 103-9, 103-10, 103-11, 103-12, 103-13, and 103-14 as shown in FIG. 3.

Figure 5A:
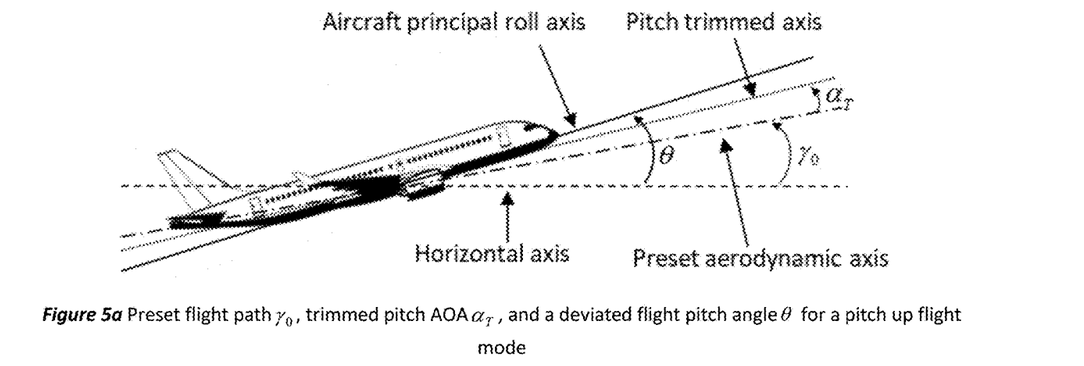
FIG. 5a and FIG. 5b are diagrams of parameter definitions for a pitch up flight mode in accordance with the disclosure.
Figure 5B:
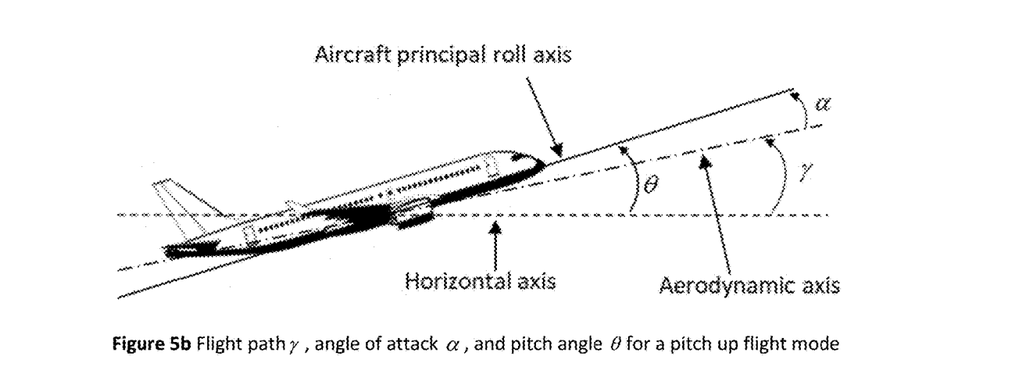
Figure 6A:
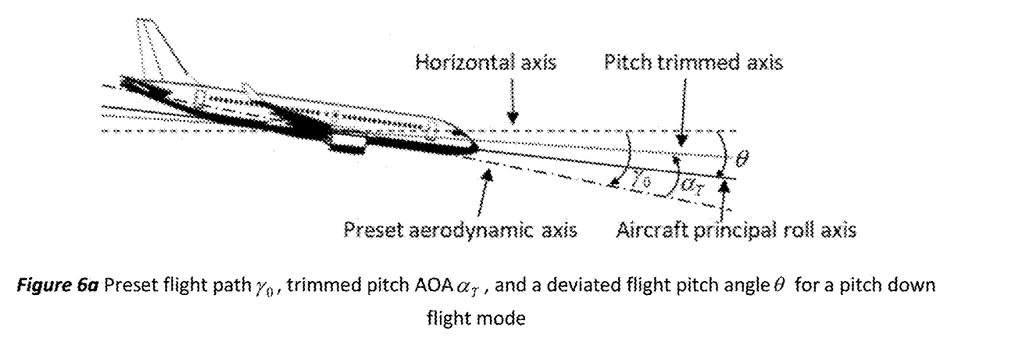
FIG. 6a and FIG. 6b are diagrams of parameter definitions for a pitch down flight mode in accordance with the disclosure.
Figure 6B:
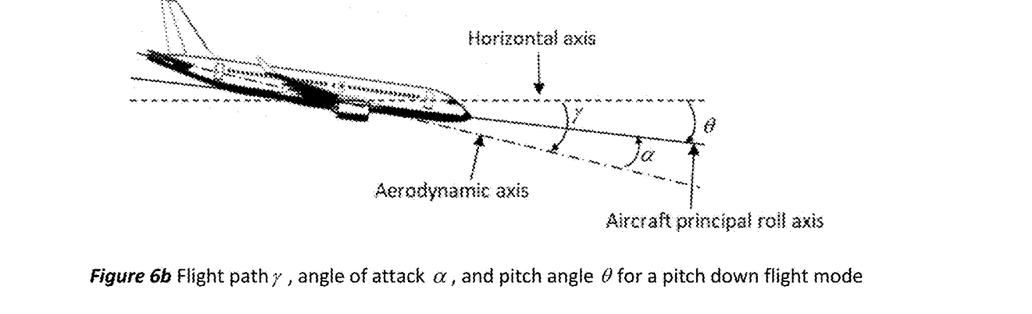

The relation of the preset flight path and the pitch trimmed angle of attack for a pitch up flight mode is illustrated in FIG. 5a with a deviated flight path at a pitch angle of $\theta$. The current flight path angle $\gamma$ and angle of attack $\alpha$ which may be deviated from the preset flight state defined by a preset flight path angle $\gamma_0$ and a pitch trimmed angle of attack $\alpha_T$ are illustrated in FIG. 5b for a pitch up flight mode. The relation of the preset flight path and the pitch trimmed angle of attack for a pitch down flight mode is illustrated in FIG. 6a with a deviated flight path at a pitch angle of $\theta$. The current flight path angle $\gamma$ and angle of attack $\alpha$ which may be deviated from the preset flight state defined by a preset flight path angle $\gamma_0$ and a pitch trimmed angle of attack $\alpha_T$ are illustrated in FIG. 6b for a pitch down flight mode.

The above damping coefficients and restoring coefficients may be provided as a function of flight parameters under a tabulated form, under empirical formulas, or some other appropriate forms which can be stored in a standalone computer or the flight management computer and can be accessed and used by the standalone computer or the flight management computer. If a current flight parameter falls in between two parameters in the pre-determined values, an interpolation may be used.

Figure 7:
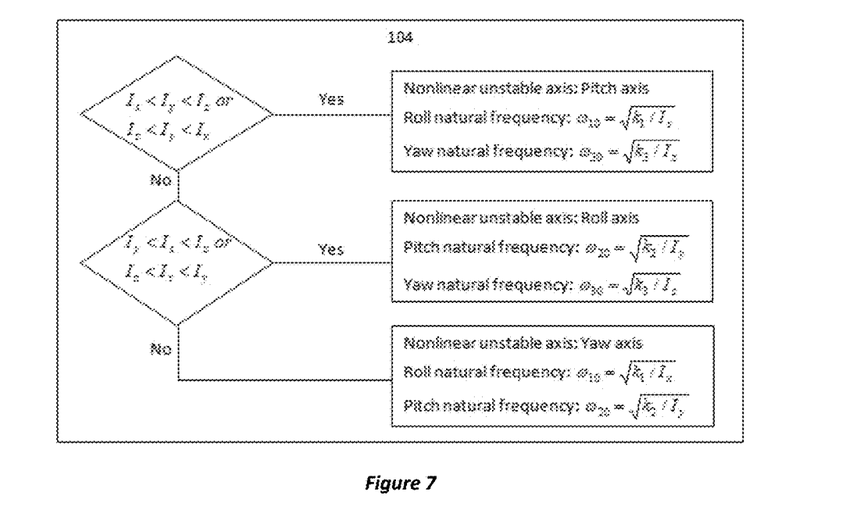
FIG. 7 is a flow chart for calculating an unstable axis and associated frequencies in accordance with the disclosure.

By comparing moments of inertia, the module 104 determines the nonlinear unstable axis which has the intermediate moment of inertia. Then the associated frequencies for that unstable axis are calculated using the restoring coefficients and the moments of inertia about the other two axes, respectively. For example, if the pitch moment of inertia is the intermediate then the nonlinear unstable axis is the pitch axis and the associated frequencies for unstable pitch axis are the roll and yaw natural frequencies which are calculated as $\omega_{10} = \sqrt{k_1/I_x}$ and $\omega_{30} = \sqrt{k_3/I_z}$, respectively. In general, commercial passenger aircrafts have a pitch nonlinear unstable mode, such as Boeing 737, Airbus 300, and etc. For some military transportation aircrafts such as B-52, the nonlinear unstable axis is roll axis because the intermediate moment of inertia of these aircrafts is roll axis instead of pitch axis. In this case, the associated frequencies are pitch and yaw natural frequencies which are calculated as $\omega_{20} = \sqrt{k_2/I_y}$ and $\omega_{30} = \sqrt{k_3/I_z}$, respectively. It is also possible to design an aircraft which has intermediate moment of inertia about yaw axis. Then for such case the associated frequencies become roll and pitch natural frequencies which are calculated in a similar way as above as shown in FIG. 7.

Figure 8:
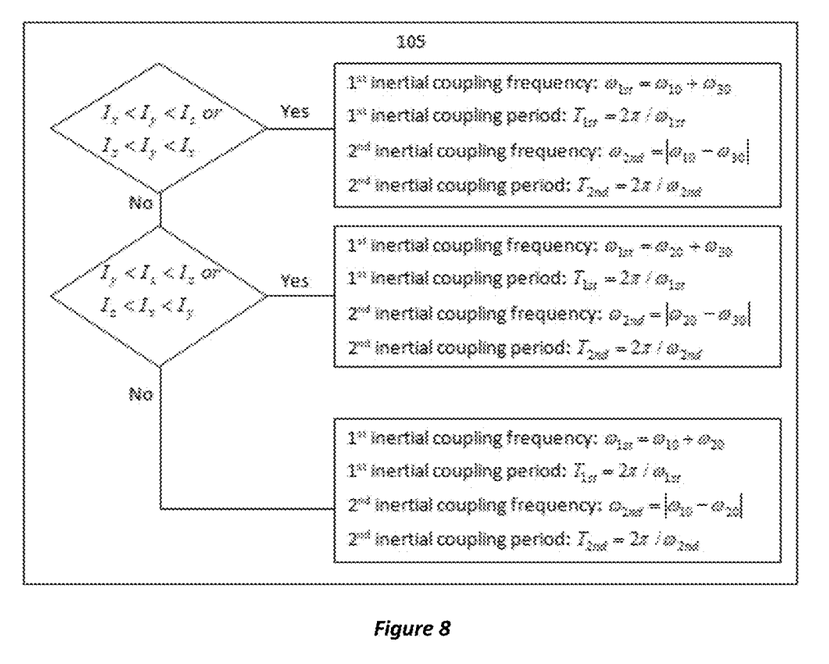
FIG. 8 is a flow chart for calculating inertial coupling frequencies and periods in accordance with the disclosure.

The module 105 calculates the first and second inertial coupling frequencies and the corresponding periods. For example, for pitch nonlinear unstable mode, the first inertia coupling frequency and period are calculated as $\omega_{1st} = \omega_{10} + \omega_{30}$ and $T_{1st} = 2\pi/\omega_{1st}$, respectively and the second inertial coupling frequency and period are calculated as $\omega_{2nd} = |\omega_{10} - \omega_{30}|$ 51 and $T_{2nd} = 2\pi/\omega_{2nd}$, respectively. For roll and yaw unstable cases, the corresponding frequencies and periods are calculated in a similar way as shown in FIG. 8. The module 105 also displays these results through the flight deck similar to displays of many other parameters by an analog scale and pointer and/or digital representation.

Figure 9:
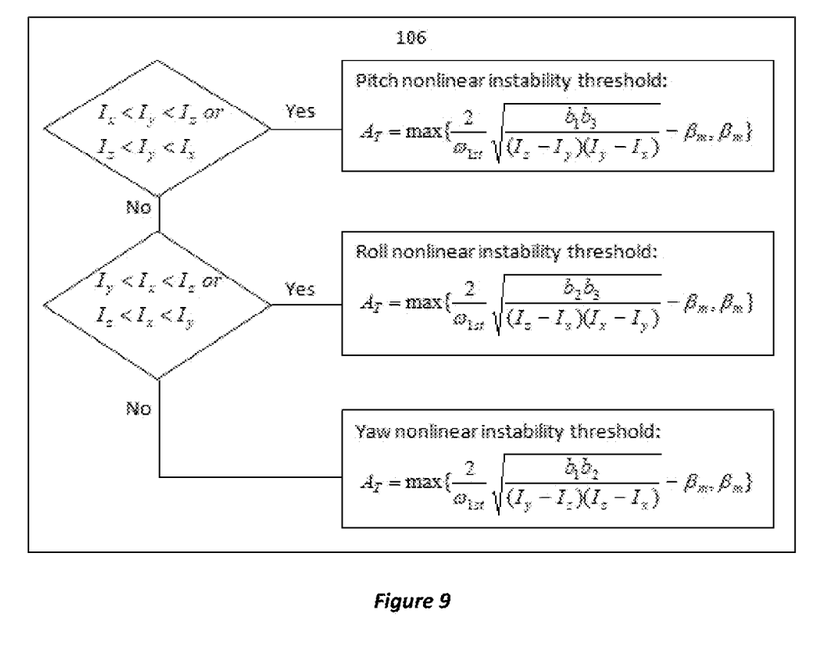
FIG. 9 is a flow chart for calculating a nonlinear instability threshold in accordance with the disclosure.

The module 106 calculates the nonlinear instability threshold as shown in FIG. 9. For example for pitch nonlinear unstable case, the nonlinear instability threshold is calculated as $$A_T = \max\left\{\frac{2}{\omega_{1st}}\sqrt{\frac{b_1 b_3}{(I_z - I_y)(I_y - I_x)}} - \beta_m, \beta_m\right\}, \quad \text{Math. 12}$$

where $\beta_m$ is a pre-determined small positive number, for example, 0.0175 radian (1°) or other small number depending on aircraft size and type. This minimum threshold $\beta_m$ is chosen to prevent the threshold from going to zero. This minimum threshold is a safety margin which needs to be determined during flight tests of every aircraft for light turbulence which is assumed to occur on every flight and causes slight, erratic changes in attitude of roll, pitch, and yaw. For roll and yaw unstable cases, the minimum thresholds may be different from the above case of pitch instability and depending on aircraft size and type, but the fundamental mechanisms are same, i.e. it is needed to account for light turbulence in roll or yaw directions, respectively. The minimum thresholds for roll and yaw are also to be determined during flight tests.

Figure 10:
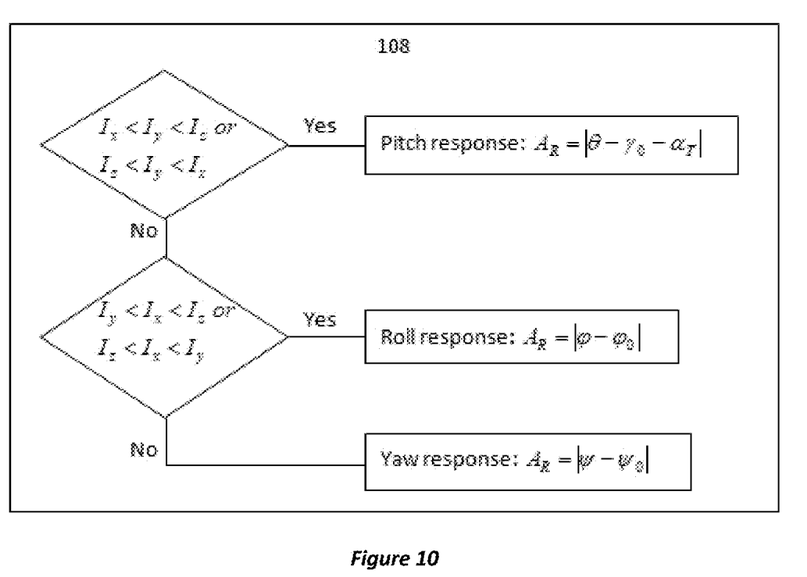
FIG. 10 is a flow chart for calculating a potential unstable response in accordance with the disclosure.

During a flight, a flight state may deviate from a preset flight state and oscillate around the preset flight state. The motion response amplitude along the nonlinear unstable axis is calculated as shown in FIG. 10. For a potential pitch unstable case $A_R = |\theta - \gamma_0 - \alpha_T|$ where the definitions of $\theta$, $\gamma_0$, $\alpha_T$ are shown in FIG. 5a and FIG. 5b for pitch up flight mode and in FIG. 6a and FIG. 6b for pitch down flight mode. For a potential roll unstable case $A_R = |\varphi - \varphi_0|$, where $\varphi$ is the current flight roll angle and $\varphi_0$ is a preset roll trim angle if there is any. For a potential yaw unstable case $A_R = |\psi - \psi_0|$, where $\psi$ is the current flight yaw angle and $\psi_0$ is a preset yaw trim angle if there is any.

It should be understood that the above descriptions may be implemented to many types of aircrafts, for example, such as a commercial aircraft, a military aircraft, an unmanned aerial vehicle (UAV), or some other appropriate type of aircraft. It should also be understood that the detailed descriptions and specific examples, while indicating the preferred embodiment, are intended for purposes of illustration only and it should be understood that it may be embodied in a large variety of forms different from the one specifically shown and described without departing from the scope and spirit of the invention. It should be also understood that the invention is not limited to the specific features shown, but that the means and construction herein disclosed comprise a preferred form of putting the invention into effect, and the invention therefore claimed in any of its forms of modifications within the legitimate and valid scope of the appended claims.

What is claimed is:

1. A method of predicting aircraft nonlinear pitch dynamic instability including:
    a. pre-obtained aircraft state parameter and coefficient data for all possible flight states;
    b. measuring current flight parameters to determine the aircraft state;
    c. calculating the inertial coupling frequencies and periods as $\omega_{1st} = \omega_{10} + \omega_{30}$ and $T_{1st} = 2\pi/\omega_{1st}$, $\omega_{2nd} = |\omega_{10} - \omega_{30}|$ and $T_{2nd} = 2\pi/\omega_{2nd}$;

d. displaying the $1^{st}$ and $2^{nd}$ inertial coupling frequencies and periods;
    e. calculating the pitch instability threshold as $$A_T = \max\left\{ \frac{2}{\omega_{1st}} \sqrt{\frac{b_1 b_3}{(I_z - I_y)(I_y - I_x)}} - \beta_m, \beta_m \right\};$$

f. calculating the pitch response around the preset equilibrium flight state as $A_R = |\theta - \gamma_0 - \alpha_T|$;

g. providing a first warning signal under the following condition:

$\lambda A_T < A_R < A_T$;

h. providing a second warning signal under the following condition:

$A_R \geq A_T$.

2. The method of claim 1, wherein the pre-obtained aircraft state parameter and coefficient data are obtained in advance by measurements and analyses during test flights of an aircraft.

3. The method of claim 1, wherein the pre-obtained aircraft state parameter and coefficient data are obtained in advance by empirical formulas and aerodynamic derivatives based on wind tunnel tests.

4. The method of claim 1, wherein the minimum threshold $\beta_m$ is in the range of (0.0018, 0.09) radian, i.e. (0.1°, 5°) and depending on aircraft type and size.

5. The method of claim 1, wherein the safety factor $\lambda$ is in the range of (0.5, 0.99) and depending on individual aircraft type and size.

6. A method of predicting aircraft nonlinear roll dynamic instability including:
    a. pre-obtained aircraft state parameter and coefficient data for all possible flight states;
    b. measuring current flight parameters to determine the aircraft state;
    c. Calculating the inertial coupling frequencies and periods as $\omega_{1st} = \omega_{20} + \omega_{30}$ and $t_{1st} = 2\pi/\omega_{1st}$, $\omega_{2nd} = |\omega_{20} - \omega_{30}|$ and $T_{2nd} = 2\pi/\omega_{2nd}$, d. displaying the $1^{st}$ and $2^{nd}$ inertial coupling frequencies and periods;
    e. calculating the roll instability threshold as $$A_T = \max\left\{ \frac{2}{\omega_{1st}} \sqrt{\frac{b_2 b_3}{(I_z - I_z)(I_x - I_y)}} - \beta_m, \beta_m \right\};$$

f. calculating the roll response around the preset equilibrium flight state as $A_R = |\varphi - \varphi_0|$;

g. providing a first warning signal under the following condition:

$\lambda A_T < A_R < A_T$;

h. providing a second warning signal under the following condition:

$A_R \geq A_T$.

7. The method of claim 6, wherein the pre-obtained aircraft state parameter and coefficient data are obtained in advance by measurements and analyses during test flights of an aircraft.

8. The method of claim 6, wherein the pre-obtained aircraft state parameter and coefficient data are obtained in advance by empirical formulas and aerodynamic derivatives based on wind tunnel tests.

9. The method of claim 6, wherein the minimum threshold $\beta_m$ is in the range of (0.0018, 0.18) radian, i.e. (01.°, 10°) and depending on individual aircraft type and size.

10. The method of claim 6, wherein the safety factor $\lambda$ is in the range of (0.5, 0.99) and depending on individual aircraft type and size.

11. A method of predicting aircraft nonlinear yaw dynamic instability including:
  a. pre-obtained aircraft state parameter and coefficient data for all possible flight states;
  b. measuring current flight parameters to determine the aircraft state;
  c. calculating the inertial coupling frequencies as $\omega_{1st} = \omega_{10} + \omega_{20}$ and $T_{1st} = 2\pi/\omega_{1st}$, $\omega_{2nd} = |\omega_{10} - \omega_{20}|$ and $T_{2nd} = 2\pi/\omega_{2nd}$;

d. displaying the $1^{st}$ and $2^{nd}$ inertial coupling frequencies and periods;
  e. calculating the yaw instability threshold as $$A_T = \max\left\{\frac{2}{\omega_{1st}}\sqrt{\frac{b_1 b_2}{(I_y - I_z)(I_z - I_x)}} - \beta_m, \beta_m\right\};$$

f. calculating the yaw response around the preset equilibrium flight state as $A_R = |\psi - \psi_0|$;

g. providing a first warning signal under the following condition:

$\lambda A_T < A_R < A_T$;

h. providing a second warning signal under the following condition $A_R \geq A_T$.

12. The method of claim 11, wherein the pre-obtained aircraft state parameter and coefficient data are obtained in advance by measurements and analyses during test flights of an aircraft.

13. The method of claim 11, wherein the pre-obtained aircraft state parameter and coefficient data are obtained in advance by empirical formulas and aerodynamic derivatives based on wind tunnel tests.

14. The method of claim 11, wherein the minimum threshold $\beta_m$ is in the range of (0.0018, 0.35) radian, i.e. (0.1°, 20°) and depending on individual aircraft type and size.

15. The method of claim 11, wherein the safety factor $\lambda$ is in the range of (0.5, 0.99) and depending on individual aircraft type and size.

* * * * *

UNITED STATES PATENT AND TRADEMARK OFFICE
CERTIFICATE OF CORRECTION

PATENT NO. : 10,705,110 B2  
APPLICATION NO. : 16/156619  
DATED : July 7, 2020  
INVENTOR(S) : Shaojie Tang Page 1 of 1

It is certified that error appears in the above-identified patent and that said Letters Patent is hereby corrected as shown below:

In the Specification

DESCRIPTION: Column 6, Line 13, "where A is" to read as "where $\lambda$ is".
DESCRIPTION: Column 8, Lines 51-52, "$\omega_{2nd} = |\omega_{10} - \omega_{30}51$" to read as "$\omega_{2nd} = |\omega_{10} - \omega_{30}|$".

In the Claims

Column 10, Line 4, "$A_R|\theta = \gamma_0 - \alpha_T|$" to read as "$A_R = |\theta - \gamma_0 - \alpha_T|$".
Column 12, Line 3, "$A_R = \psi - \psi_0|$" to read as "$A_R = |\psi - \psi_0|$".

Signed and Sealed this  
Sixteenth Day of March, 2021

Drew Hirshfeld  
*Performing the Functions and Duties of the  
Under Secretary of Commerce for Intellectual Property and  
Director of the United States Patent and Trademark Office*